(12) United States Patent
Yasukouchi et al.

(10) Patent No.: US 7,631,918 B2
(45) Date of Patent: Dec. 15, 2009

(54) REAR STRUCTURE OF A VEHICULAR BODY

(75) Inventors: Satoshi Yasukouchi, Naka-gun (JP); Hiroshi Satou, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 134 days.

(21) Appl. No.: 11/651,748

(22) Filed: Jan. 10, 2007

(65) Prior Publication Data
US 2007/0158977 A1 Jul. 12, 2007

(30) Foreign Application Priority Data
Jan. 12, 2006 (JP) ............................. 2006-004799

(51) Int. Cl.
*B60R 22/18* (2006.01)
(52) U.S. Cl. ...................................................... 296/30
(58) Field of Classification Search .............. 280/801.1; 296/29, 30, 203.04
See application file for complete search history.

(56) References Cited

U.S. PATENT DOCUMENTS

| | | | | |
|---|---|---|---|---|
| 3,179,961 A | * | 4/1965 | Ward et al. | 114/363 |
| 3,328,935 A | * | 7/1967 | Peras | 52/630 |
| 3,590,936 A | * | 7/1971 | Wessells et al. | 180/312 |
| 4,369,981 A | * | 1/1983 | Chiba et al. | 280/834 |
| 4,470,619 A | | 9/1984 | Imajyo et al. | |
| 4,557,519 A | * | 12/1985 | Matsuura | 296/204 |
| 4,763,925 A | * | 8/1988 | Onoe et al. | 280/808 |
| 4,775,181 A | * | 10/1988 | Shoda | 296/203.04 |
| 4,973,103 A | * | 11/1990 | Imajyo et al. | 296/203.04 |
| 5,180,206 A | * | 1/1993 | Toyoda | 296/204 |
| 5,558,369 A | * | 9/1996 | Cornea et al. | 280/800 |
| 5,855,407 A | * | 1/1999 | Fukuda | 296/203.03 |
| 6,053,564 A | * | 4/2000 | Kamata et al. | 296/187.09 |
| 6,237,304 B1 | * | 5/2001 | Wycech | 52/847 |
| 6,830,287 B1 | * | 12/2004 | Aghssa et al. | 296/187.11 |
| 6,971,709 B2 | * | 12/2005 | Haewoong | 296/203.04 |
| 2003/0071490 A1 | * | 4/2003 | Nishikawa et al. | 296/203.04 |
| 2004/0195865 A1 | * | 10/2004 | Tomita | 296/203.04 |
| 2006/0097533 A1 | * | 5/2006 | Watanabe et al. | 296/30 |

FOREIGN PATENT DOCUMENTS

DE  40 30 829 A1  4/1991

(Continued)

OTHER PUBLICATIONS

Partial European Search Report for European Application No. 07100402.2-1523, dated May 24, 2007 (6 pages).

(Continued)

*Primary Examiner*—Glenn Dayoan
*Assistant Examiner*—Paul A Chenevert
(74) *Attorney, Agent, or Firm*—Osha • Liang LLP

(57) ABSTRACT

A rear structure of a vehicular body has side sills disposed at lateral ends of the vehicular body. The rear structure further has side rear members having a hat-shaped cross-section and having a kick-up portion that is upwardly inclined. The side rear members are bonded to the side sills at bonded portions, and extend toward a rear of the vehicular body. The rear structure further has a cross member connecting side sills in a lateral direction across the vehicular body. The cross member is connected to each of the side sills at connected portions at a rear of the kick-up portions. The rear structure further has reinforcements having a closed cross-section in a longitudinal plane and in a lateral plane. The reinforcements are disposed in the side rear members between the bonded portions and the connected portions.

7 Claims, 6 Drawing Sheets

FOREIGN PATENT DOCUMENTS

| | | |
|---|---|---|
| EP | 1 077 172 A2 | 2/2001 |
| JP | 57030643 A * | 2/1982 |
| JP | 58-112663 | 8/1983 |
| JP | 63-89374 | 6/1988 |
| JP | 2-41885 | 3/1990 |
| JP | 3138175 | 6/1991 |
| JP | 05131953 A * | 5/1993 |
| JP | 06032255 A * | 2/1994 |
| JP | 06064558 A * | 3/1994 |
| JP | 8-276820 | 10/1996 |

OTHER PUBLICATIONS

Extended European Search Report for European Application No. 07100402.2-1523, dated Aug. 16, 2007 (9 pages).

Office Action in Chinese Patent Application No. 200610170572 and English translation thereof, dated Dec. 5, 2008 (21 pages).

* cited by examiner

REAR STRUCTURE OF A VEHICULAR BODY

CROSS-REFERENCE TO RELATED APPLICATIONS

This application claims priority to Japanese Patent Application No. 2006-004799, filed on Jan. 12, 2006, the disclosure of which is incorporated by reference herein in its entirety.

FIELD OF THE INVENTION

The present invention relates to a rear structure of a vehicular body having a side rear member that extends from a rear portion of a side sill toward a rear portion of a vehicle.

BACKGROUND ART

Generally, a rear of a vehicle is provided with a pair of side rear members at both sides of the vehicle. The side rear members extend along the longitudinal direction of the vehicle. The side rear members are bonded to rear portions of inner side sills and extend from the bonded portion toward the rear portion of the vehicle so as to be attached to a rear bumper of the vehicle.

The side rear members are constructed in a manner so as to increase the cross-sectional strength by providing a bulkhead (i.e., a seat installation bracket) thereto. This is to prevent the side rear members from bending upwardly due to a load applied when a rear crash occurs. However, since the bulkhead alone does not provide a sufficient reinforcement, a large side member reinforcement can be further installed to the side rear members. Such a feature is disclosed in Japanese Patent No. 3138175.

However, the conventional rear structure of a vehicular body is disadvantageous in that the weight of the vehicular body and the manufacturing cost inevitably increase due to the increase in the number of components. This is because the side member reinforcement is installed to the side rear members in addition to installing the bulkhead as a reinforcing member of the side rear members. Further, if a kick-up portion is formed on the side rear members, the side rear members may be bent upwardly at the kick-up portion.

SUMMARY OF INVENTION

In one or more embodiments of the present invention, a rear structure of a vehicular body is adapted to effectively prevent an upward bending of a side rear member when a rear crash occurs while minimizing the number and weight of components.

In one or more embodiments of the present invention, a rear structure of a vehicular body comprises a side sill, a side rear member having a hat-shaped cross-section, a cross member, and a reinforcement.

In one or more embodiments of the present invention, a rear structure of a vehicular body comprises side sills, side rear members, a cross member, and reinforcements. The side sills are disposed at both sides of the vehicular body. Each of the side rear members has a hat-shaped cross-section and comprises a kick-up portion that is upwardly inclined towards a rear of the vehicular body. The side rear members are bonded to the side sills at bonded portions, and extend toward the rear of the vehicular body. The cross member connects the side sills laterally across the vehicular body, and is connected to each of the side sills at connected portions at a rear of the kick-up portions. The reinforcements have a closed cross-section in both a longitudinal plane and a lateral plane and are disposed within the side rear members between the bonded portions and the connected portions.

In one or more embodiments of the present invention, a reinforcement is configured to be disposed within a side rear member of a vehicular body and comprises a planar portion having opposing edges, a pair of side portions facing each other and formed perpendicularly downward from the opposing edges of the planar portion. Each of the pair of side portions have a bottom edge and side edges with bottom flange portions formed perpendicularly from each of the pair of side portions at the bottom edges and extending outwards parallel to the planar portion. Side flange portions are formed perpendicularly from the side edges of each of the side portions and extend perpendicularly outward from the side flange portions.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In this application, a longitudinal direction is the direction in which a vehicle incorporating the frame structure would travel, and front is the forward direction of travel of the vehicle, while rear is the backward direction of travel of the vehicle. A lateral direction is the direction in the ground plane perpendicular to the longitudinal direction. A side refers to a lateral end, and inwards means towards the lateral center of the vehicle, while outwards means from the center outward towards the sides of the vehicle or lateral outward from the sides of the vehicle. An upward direction is a direction perpendicular to both the longitudinal direction and the lateral direction, and extends from the ground towards the sky, while a downward direction is the direction opposite the upward direction.

Figure 1:
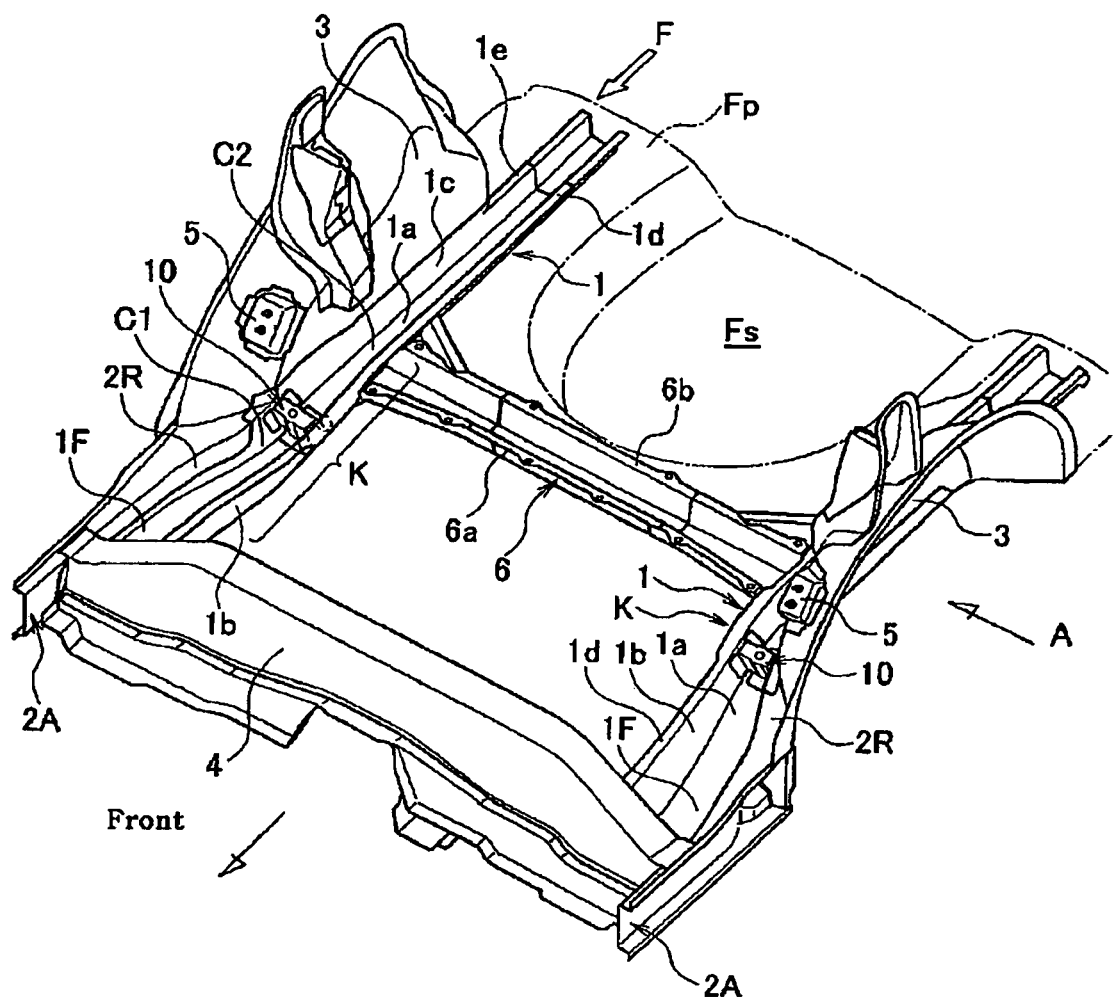
FIG. 1 is a perspective view of a frame structure of a rear portion of a vehicular body according to one or more embodiments of the present invention.
Figure 2:
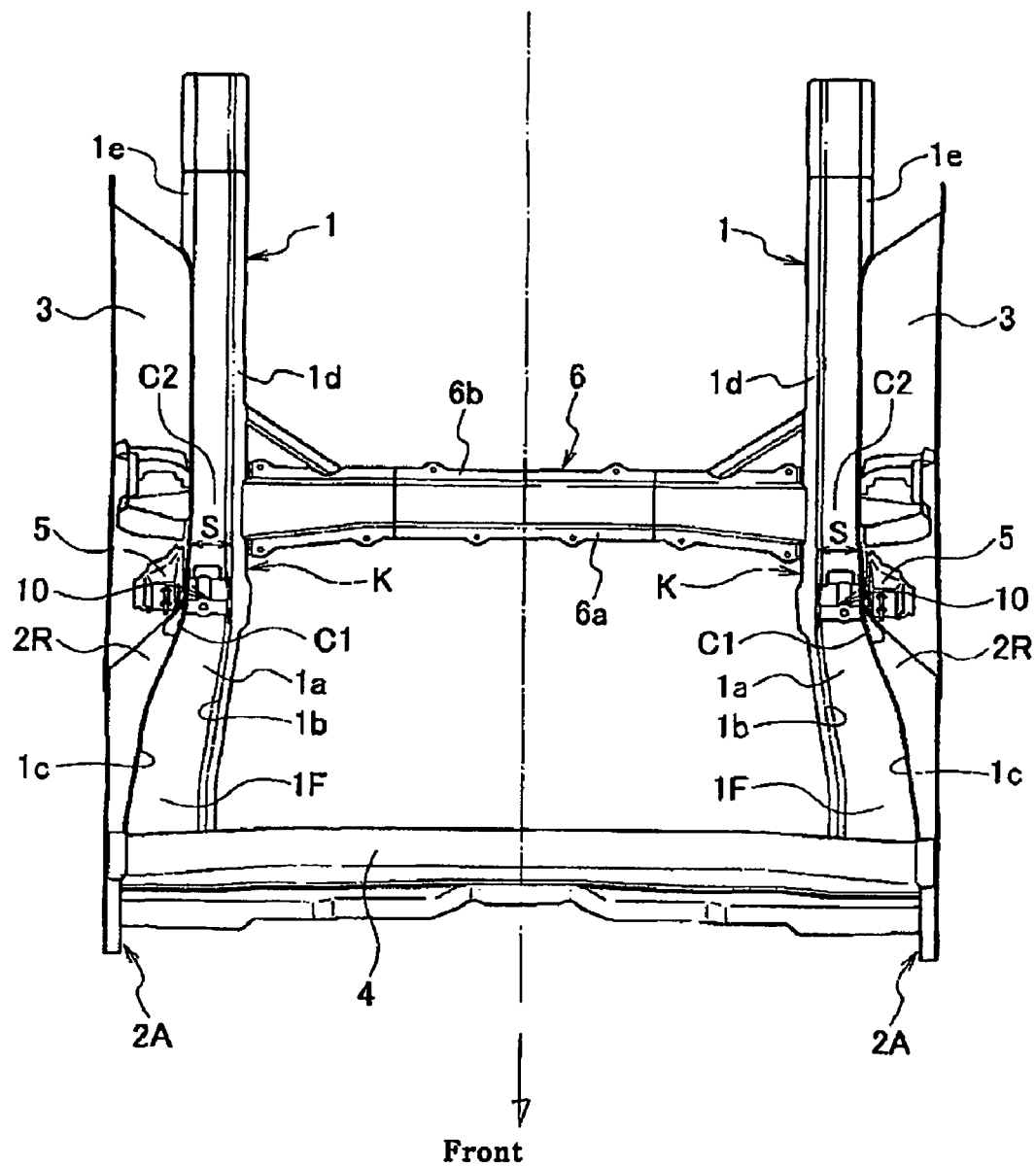
FIG. 2 is a top view of a frame structure of a rear portion of a vehicular body according to one or more embodiments of the present invention.
Figure 3:
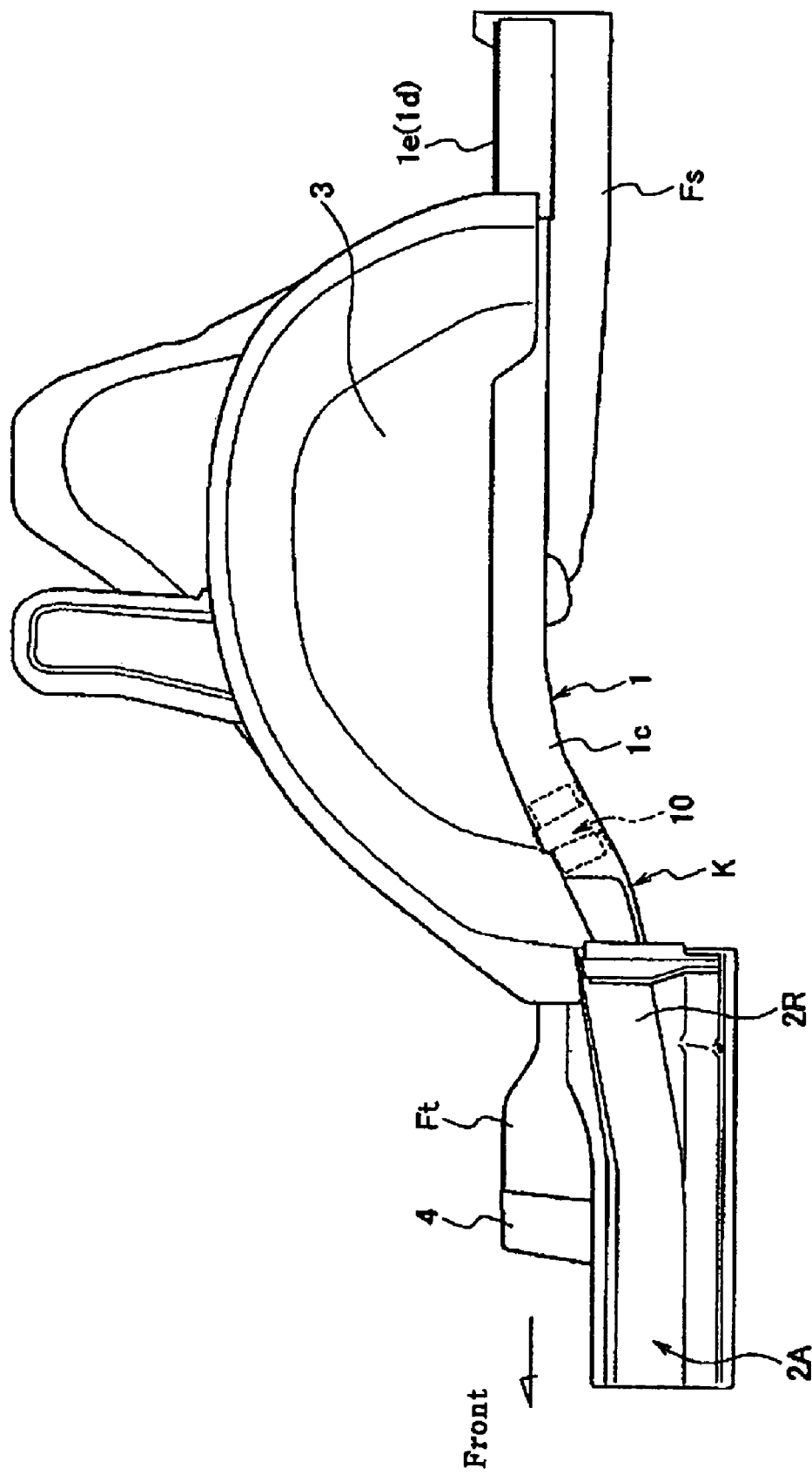
FIG. 3 is a side view showing the side portion of a frame structure indicated by arrow A shown in FIG. 1.

In the rear structure according to one or more embodiments of the present invention, as shown in FIGS. 1 and 2, right and left side rear members 1 are disposed in the rear portion of the vehicle body at both sides, extending along the longitudinal direction of the vehicle. Each of the side rear members 1 has its front portion 1F bonded at a bonded portion C1 of an inner side sill 2A. Each side rear member extends towards the rear (upward in FIG. 2) of the vehicular body from the bonded portion C1. Further, as shown in FIG. 3, each side rear member 1 has a kick-up portion K, which is inclined inwardly and upwardly along the interior of a rear wheel house 3, for engagement to a rear bumper (not shown).

Figure 4:
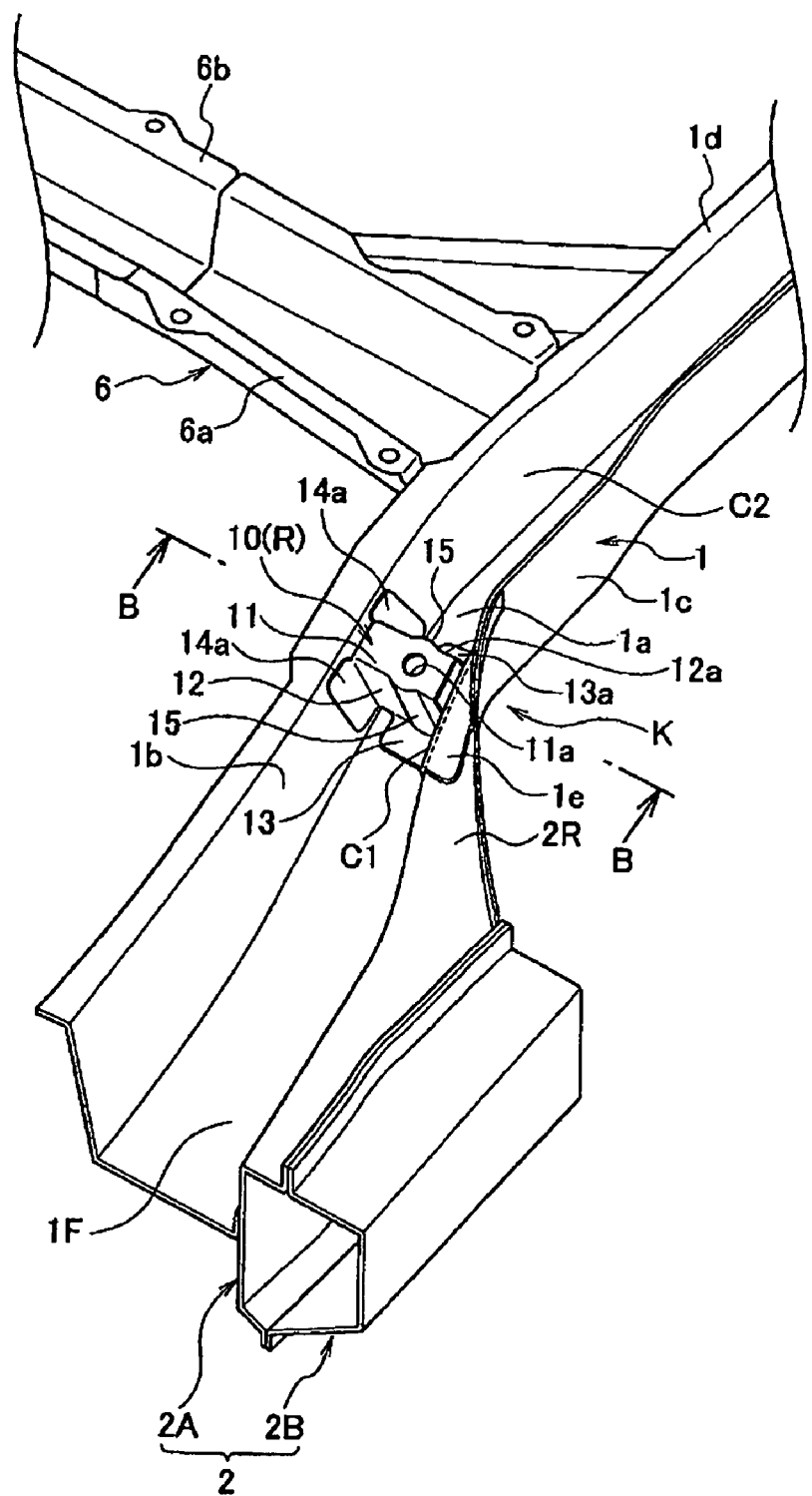
FIG. 4 is an enlarged perspective view showing a portion to which a reinforcement is installed according to one or more embodiments of the present invention.

FIG. 4 shows one of the inner side sills 2A that are disposed at both sides of the vehicle. The inner side sill 2A has a channel beam shape and is open towards the sides of the vehicle. A side sill 2 of a closed cross-section structure is formed by bonding the inner side sill 2A to an outer side sill 2B, which has a channel beam shape and is open inward towards the vehicle and toward the outwardly opened inner side sill 2A.

Figure 5:
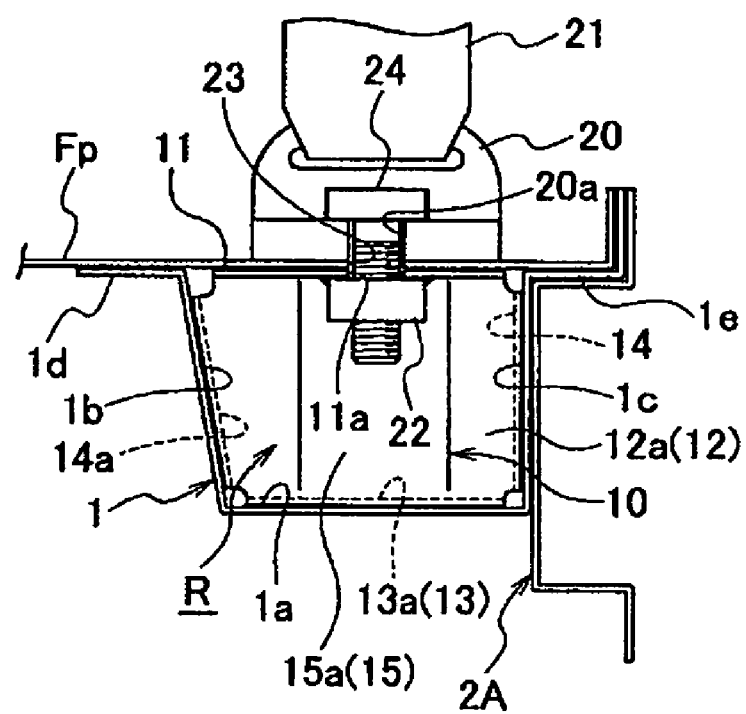
FIG. 5 is an enlarged cross-sectional view along the line B-B shown in FIG. 4.

The side rear member 1 has a hat-shaped cross-section structure, that is open upwards and that is configured to include a bottom surface 1a, inner and outer side surfaces 1b and 1c, respectively, and flanges 1d and 1e on the top edges of the inner and outer side surfaces 1b and 1c. The flanges 1d and 1e of the top edges are to be bonded to the undersurface of a floor panel Fp to form a closed cross-section, as shown in FIG. 5. Further, a portion of the flange 1e extends upward so as to be bonded to the inside of the rear wheel housing 3.

At the front portion 1F of the side rear member 1, the flange 1e is cut out and an outside surface 1c is bonded to the inner side sill 2A.

In one or more embodiments, as shown in FIGS. 1 to 3, a rear seat cross member 4 is connected to the right and left inner side sills 2A at the front end of the side rear member 1. The front portion of a rear seat (not shown) is supported by the rear seat cross member 4. A seatback fixing bracket 5 of the rear seat is coupled to the front surface of the rear wheel house 3. In FIG. 3, the reference numeral Ft denotes a floor tunnel portion.

The rear portions of the kick-up portions K of the right and left side rear members 1 are connected to each other by a cross member 6 extending across the vehicle in the lateral direction. The cross member 6 is configured to have a hat-shaped cross-section that opens upwardly and forms a closed cross-section by bonding the flanges 6a and 6b of the top ends to the undersurface of the floor panel Fp.

As shown in FIGS. 1 and 3, in one or more embodiments a recessed spare tire pan Fs may be formed at the vehicle's rear end of the floor panel Fp, without interfering with the invention.

As shown in FIG. 4, a reinforcement 10 is coupled to the inside of the hat-shaped cross-section of the side rear member 1 in an intermediate area between the rear portion 2R of the inner side sill 2A of the side rear member 1 and the cross member 6. In one or more embodiments the reinforcement 10 is formed having a hat-shaped cross section open downwards. The reinforcement 10 usefully includes bottom flanges 13 and 13a, which are bonded to the bottom surface 1a of the side rear member 1. In one or more embodiments as shown in FIG. 5, the side rear member 1 and the reinforcement 10 are configured to form a box-shaped cross-section structure R closed in both the longitudinal direction and lateral direction of the vehicle.

Figure 6:
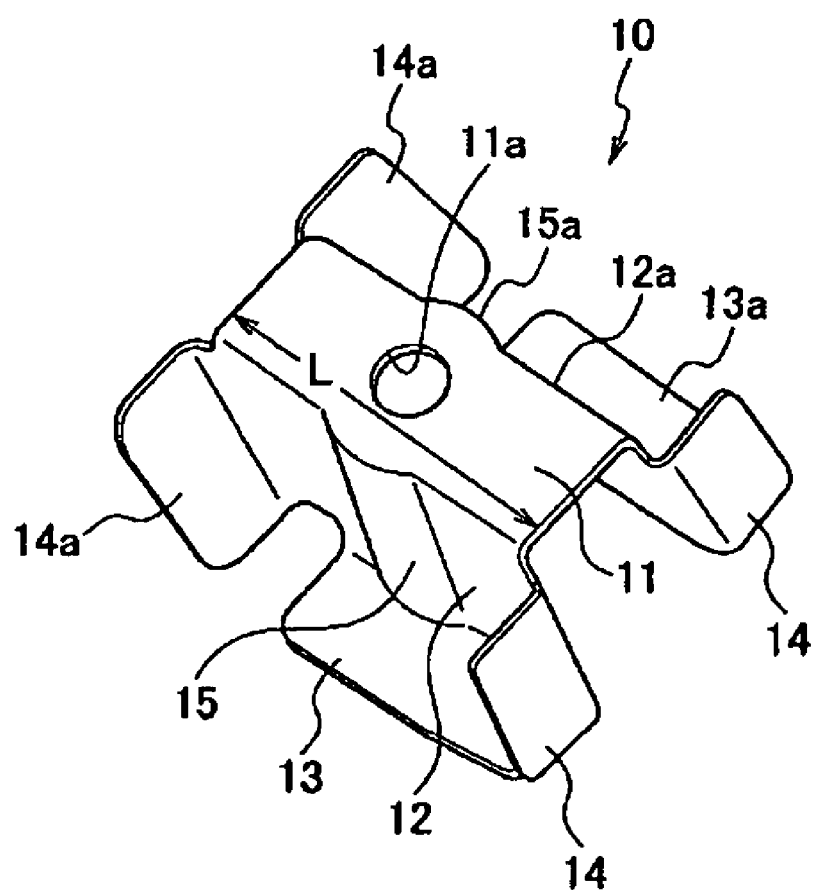
FIG. 6 is a perspective view of the reinforcement according to one or more embodiments of the present invention.

In one or more embodiments, as shown in FIG. 6, the reinforcement 10 has a hat-shaped cross-section structure, which opens downwards and which may be usefully configured to include a planar top surface 11, a pair of opposed side surfaces 12 and 12a extending downward from edges of the top surface 11 and facing each other along the longitudinal direction of the side rear member 1. The reinforcement 10 may also have bottom flanges 13 and 13a bent outwardly from bottom edges of the side surfaces 12 and 12a, respectively. The lateral length L of the top surface 11, as shown in FIG. 6, is substantially equal to the distance S between the side surfaces 1b and 1c of the side rear member 1, as shown in FIG. 2.

As shown in FIG. 4, when the reinforcement 10 is disposed within the side rear member 1, the reinforcement 10 and the side rear member 1 form a closed cross-section structure R. The closed cross-section structure R is formed by the bottom surface 1a and both side surfaces 1b and 1c of the side rear member 1, and the top surface 11 and both side surfaces 12 and 12a of the reinforcement 10. This is done by disposing the side surfaces 12 and 12a along the longitudinal direction of the vehicle and bonding the bottom flanges 13 and 13a to the bottom surface 1a of the side rear member 1.

The reinforcement 10 may also usefully include side flanges 14 and 14a bent outwardly from both ends of the front and rear side surfaces 12 and 12a. The flanges 14 and 14a may be bonded to both side surfaces 1b and 1c, respectively, of the side rear member 1.

The reinforcement 10 may also usefully include protrusions 15 and 15a. The protrusions 15 and 15a may have arc cross-section shapes extending substantially from the top to the bottom of the reinforcement 10 along the middle portions of the front and rear side surfaces 12 and 12a.

In one or more embodiments of the present invention, as shown in FIG. 5, the top surface 11 of the reinforcement 10 is coupled to the floor panel Fp and a belt anchor 20 is disposed at the coupled portion, so that the supporting strength of the belt anchor 20 may be improved.

For example, the seat belt may be disposed at the rear seat having its webbing end 21 connected to the vehicle body side via the belt anchor 20. In one or more embodiments of the present invention, the top surface 11 of the reinforcement 10 is coupled to the floor panel Fp with the belt anchor 20 installed at the coupled portion by: forming a bolt-insertion hole 11a at the central portion of the top surface 11 of the reinforcement 10; fixing a welding nut 22 to the bolt-insertion hole 11a; inserting a bolt 24 into an installation hole 20a of the belt anchor 20 and an insertion hole 23 formed in the floor panel Fp; and engaging the bolt 24 to the welding nut 22.

As may be understood with reference to FIG. 2, when the reinforcement 10 is coupled to the side rear member 1 in the intermediate area between the rear portion 2R of the inner side sill 2A and the cross member 6, the reinforcement 10 may usefully overlap the rear portion 2R of the inner side sill 2A in the longitudinal direction of the vehicular body.

In a rear structure of the vehicular body according to one or more embodiments of the present invention, the reinforcement 10 is usefully coupled to the inside of the hat-shaped cross-section of the side rear member 1 in the intermediate area between the rear portion 2R of the inner side sill 2A, to which the front portion 1F of the side rear member 1 is bonded, and the cross member 6 connected to the rear portion of the kick-up portion K. In this embodiment a box-shaped cross-section structure R is formed closed along the longitudinal and lateral directions of the vehicle. Therefore, even if a load F is exerted during a rear crash (see FIG. 1) of the vehicle, the closed cross-section structure R serves as a rigidifying portion to effectively prevent the kick-up portion K of the side rear member 1 from bending upwards.

Specifically, in one or more embodiments of the present invention, there are disposed three rigidifying portions, namely: the reinforcement 10 at or along the kick-up portion; a bonded portion C1 at the front of the closed cross-section structure R, where the side rear member 1 is bonded to the rear portion 2R of the inner side sill 2A; and a connected portion C2 at the rear of the closed cross-section structure R, where the cross member 6 is connected to the side rear member 1. The rigidity of the side rear member 1 can be improved by the three rigid portions.

Accordingly, the reinforcement 10, even if small, can reinforce the side rear member 1 over a wide area. Further, upward bending of the kick-up portion K may be effectively reduced or prevented when a rear crash of the vehicle occurs. The number and weight of reinforcing components could also be thus minimized.

In one or more embodiments of the present invention, the top surface 11 of the reinforcement 10 is coupled to the front panel Fp and the belt anchor 20 is installed at the coupled portion. This is so that the supporting strength of the belt anchor 20 could be further improved by the reinforcement 10.

In addition, the reinforcement 10 can be coupled by being positioned overlapping the bonding portion C1 at rear portion 2R of the inner side sill 2A at the rear side of the longitudinal direction of the vehicle body. Since the reinforcement 10 is installed at both the bonded portion C1 of the side rear member 1 and the inner side sill 2A where the stress is often concentrated during a rear end crash. Thus, the side rear member 1 can be effectively reduced or prevented from upwardly bending when a rear crash of the vehicle occurs.

The reinforcement 10 may include the side flanges 14 and 14a, which are bonded to both side surfaces 1b and 1c of the side rear member 1. The reinforcement 10 is bonded to the bottom surface 1a of the side rear member 1 using the bottom flanges 13 and 13a. Therefore, the coupling strength to the side rear member 1, as well as the rigidity of the side rear member 1, can be improved so as to reduce or prevent any upward bending when the rear crash of the vehicle occurs.

The protrusions 15 and 15a are formed over the entire width along the height direction of the front and rear side surfaces 12 and 12a of the reinforcement 10. Because the protrusions 15 and 15a serve as reinforcing portions to improve the rigidity of the front and rear side surfaces 12 and 12a, the reinforcing effect upon the side rear member 1 by the reinforcement 10 can be further improved so as to more effectively reduce or prevent an upward bending of the side rear member when the rear crash of the vehicle occurs.

Further, reinforcement 10 may be coupled by overlapping the connected portion of the side rear member 1 and the cross member 6 at the rear side of the longitudinal direction of the vehicle body. In such a case, the reinforcement 10 is installed at the connected portion of the side rear member 1 and the cross member 6, where the stress is concentrated when the rear crash of the vehicle occurs. Accordingly, the side rear member 1 can be more effectively prevented from bending upwardly when a rear crash of the vehicle occurs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A reinforcement configured to be disposed within a side rear member of a vehicular body, comprising;
    a planar portion having opposed edges;
    a pair of side portions facing each other and formed perpendicularly downward from the opposed edges of the planar portion, each of the pair of side portions having a bottom edge and side edges;
    bottom flange portions formed perpendicularly from the bottom edges of each of the pair of side portions at and extending outwards parallel to the planar portion; and
    side flange portions formed perpendicularly from the side edges and extending outward perpendicularly to the side portion;
    wherein the planar portion is configured to be coupled to a floor panel, and a hole formed at the center of the planar portion is configured to couple a belt anchor to the floor panel and the planar portion, and
    wherein the reinforcement is configured to overlap, in a longitudinal direction of the vehicular body, a connected portion between a cross member and the side rear member.

2. The reinforcement of claim 1, wherein each of the pair of side portions comprises a protrusion.

3. The reinforcement of claim 2, wherein the protrusions comprise arcuate shaped portions formed along the side portions extending from the bottom flange portions to the planar portion.

4. A rear structure of a vehicular body, comprising;
    side sills disposed at both sides of the vehicular body;
    side rear members, each having a hat-shaped cross-section and comprising a kick-up portion that is upwardly inclined towards a rear of the vehicular body, the side rear members being bonded to the side sills at bonded portions and extending toward the rear of the vehicular body;
    a means for connecting the side rear members laterally across the vehicular body at connected portions located at a rear of the kick-up portions; and
    a means for reinforcing disposed within the side rear members between the bonded portions and the connected portions, wherein the means for reinforcing comprises side flanges bonded to opposite side surfaces of the hat-shaped cross-section,
    wherein the reinforcements are disposed proximate to the bonded portions and the reinforcements overlap the connected portions in the longitudinal direction of the vehicular body.

5. A rear structure of a vehicular body, comprising;
    side sills disposed at both sides of the vehicular body;
    side rear members, each having a hat-shaped cross-section and comprising a kick-up portion that is upwardly inclined towards a rear of the vehicular body, the side rear members being bonded to the side sills at bonded portions and extending toward the rear of the vehicular body;
    a cross member connecting the side rear members laterally across the vehicular body, the cross member being connected to each of the side rear members at connected portions located at a rear of the kick-up portions;
    reinforcements having a closed cross-section in a longitudinal plane and in a lateral plane and the reinforcements being disposed within the side rear members between the bonded portions and the connected portions; and
    each reinforcement comprising side flanges bonded to opposite side surfaces of the hat-shaped cross-section,
    wherein the reinforcements are disposed proximate to the bonded portions and the reinforcements overlap the connected portions in the longitudinal direction of the vehicular body.

6. The rear structure of claim 5, wherein the reinforcements comprise a pair of side portions facing each other in the longitudinal direction of the vehicular body, each of the pair of side portions having a protrusion.

7. The rear structure of claim 5, wherein a top surface portion of the reinforcement is coupled to a floor panel at a coupled portion, and wherein a belt anchor is disposed at the coupled portion.

* * * * *